(No Model.)  H. J. HAIGHT.  11 Sheets—Sheet 1.

RECEIVING, TRANSMITTING, AND DISTRIBUTING INSTRUMENT FOR ELECTRO MAGNETIC THERMOSCOPES.

No. 376,149. Patented Jan. 10, 1888.

Fig. 1.

Witnesses
F. W. Lane.
A. S. Browne.

Inventor,
Henry Jansen Haight,
By his Attorney, J. S. Brown.

(No Model.)   11 Sheets—Sheet 2.

H. J. HAIGHT.
RECEIVING, TRANSMITTING, AND DISTRIBUTING INSTRUMENT FOR ELECTRO MAGNETIC THERMOSCOPES.

No. 376,149.   Patented Jan. 10, 1888.

(No Model.)  11 Sheets—Sheet 3.
H. J. HAIGHT.
RECEIVING, TRANSMITTING, AND DISTRIBUTING INSTRUMENT FOR ELECTRO MAGNETIC THERMOSCOPES.

No. 376,149. Patented Jan. 10, 1888.

Fig. 3.

Witnesses
F. W. Lane
A. S. Browne

Inventor
Henry Jansen Haight,
By his Attorney, J. S. Brown.

(No Model.)  H. J. HAIGHT.  11 Sheets—Sheet 4.

RECEIVING, TRANSMITTING, AND DISTRIBUTING INSTRUMENT FOR ELECTRO MAGNETIC THERMOSCOPES.

No. 376,149.  Patented Jan. 10, 1888.

Fig. 4.

(No Model.)  H. J. HAIGHT.  11 Sheets—Sheet 5.

RECEIVING, TRANSMITTING, AND DISTRIBUTING INSTRUMENT FOR ELECTRO MAGNETIC THERMOSCOPES.

No. 376,149.  Patented Jan. 10, 1888.

Fig. 5.

Witnesses
F. W. Lane
A. S. Browne

Inventor
Henry Jansen Haight,
By his Attorney, J. S. Brown.

(No Model.) 11 Sheets—Sheet 6.
H. J. HAIGHT.
RECEIVING, TRANSMITTING, AND DISTRIBUTING INSTRUMENT FOR ELECTRO MAGNETIC THERMOSCOPES.

No. 376,149. Patented Jan. 10, 1888.

Fig. 6.

Witnesses
F. W. Lane
A. H. Browne

Inventor
Henry Jansen Haight
By his Attorney,
J. S. Brown (No Model.)  H. J. HAIGHT.  11 Sheets—Sheet 7.

RECEIVING, TRANSMITTING, AND DISTRIBUTING INSTRUMENT FOR
ELECTRO MAGNETIC THERMOSCOPES.

No. 376,149.  Patented Jan. 10, 1888.

(No Model.)  11 Sheets—Sheet 8.

H. J. HAIGHT.
RECEIVING, TRANSMITTING, AND DISTRIBUTING INSTRUMENT FOR ELECTRO MAGNETIC THERMOSCOPES.

No. 376,149.  Patented Jan. 10, 1888.

(No Model.)  11 Sheets—Sheet 9.
H. J. HAIGHT.
RECEIVING, TRANSMITTING, AND DISTRIBUTING INSTRUMENT FOR ELECTRO MAGNETIC THERMOSCOPES.

No. 376,149.  Patented Jan. 10, 1888.

UNITED STATES PATENT OFFICE.

HENRY JANSEN HAIGHT, OF NEW YORK, N. Y.

RECEIVING, TRANSMITTING, AND DISTRIBUTING INSTRUMENT FOR ELECTRO-MAGNETIC THERMOSCOPES.

SPECIFICATION forming part of Letters Patent No. 376,149, dated January 10, 1888.

Application filed June 24, 1886. Serial No. 206,154. (No model.)

*To all whom it may concern:*

Be it known that I, HENRY JANSEN HAIGHT, a citizen of the United States, residing in the city, county, and State of New York, have invented an Improved Receiving, Transmitting, and Distributing Instrument for Electro-Magnetic Thermoscopes; and I do hereby declare that the following is a full and exact description thereof, reference being had to the accompanying drawings, making part of this specification.

The purpose of this invention is to provide a superior instrument not only for receiving and exhibiting the thermometric indications transmitted by electrical means from distant observatories or stations, as set forth, for instance, in my application for Letters Patent filed November 21, 1885, Serial No. 183,543, but also for transmitting the same indications through continued electrical circuits to other distant observatories or stations and through branch electrical circuits to local stations or places situated around or in the vicinity of the main observatory or station, and also for distributing the same indications through a multiplicity of branch circuits from the local stations or places to particular buildings or localities, as may be required or called for to subserve public convenience or meet private demand.

An instrument of one construction serves for any or all of the purposes above indicated; but as many of the instruments are to be used as may be needed in different places or positions.

In the accompanying drawings.

Like letters designate corresponding parts in all of the figures.

In the drawings, A represents the base or support, of wood or other suitable material and of circular or any other suitable and desired form; B, the temperature-scale, graduated with degrees to indicate the temperature, and C the temperature-indicating index, to be actuated by electro-magnetic means from a distant observatory or station. For this purpose I employ two electro-magnets, D E—one, as D, placed in the increasing-temperature circuit, from any distant observatory or station, as set forth, for instance, in my aforesaid application for Letters Patent, No. 183,543, and the other magnet, E, similarly placed in the decreasing-temperature circuit, extending from the distant observatory or station. The armatures *a b* of these two magnets are respectively mounted on the corresponding ends of two levers, F G, so that each lever has a vibratory movement separate from the other when the circuit of its magnet is alternately closed and broken, and therefore either the increasing temperature or the decreasing temperature indications may go on progressively, degree by degree, unaffected by the other. The means by which the vibrations of these two armature-levers move the index C along the temperature-scale B to correspond with the temperature-indications of the transmitting observatory or station I now proceed to describe.

Upon the shaft H of the index C a gear-wheel, I, is secured, into which gear-wheel two smaller gear-wheels, J K, match, preferably located on opposite sides of the said index-shaft and larger gear-wheel. These smaller gear-wheels are mounted, respectively, on transmitting-shafts c d, parallel with the index shaft, and have upon them, respectively, ratchet-wheels L M, into which take pawls e f, pivoted upon the respective armature-levers F G, so that the vibration of either lever through its pawl moves its ratchet-wheel tooth by tooth, each tooth of either ratchet-wheel corresponding with one degree of temperature on the scale B. The ratchet-wheels, being on opposite sides of the index-wheel, are so notched and arranged in relation to the actuating-pawls that one ratchet-wheel, when moved forward, moves the index C in one direction and the other ratchet-wheel moves the index in the other direction, whereby the increasing-temperature magnet, by the vibration of its armature-lever, moves the index upward along the temperature scale, and the decreasing-temperature magnet, through its armature-lever, moves the index downward along the scale. The two armature levers are retracted on the breaking of the circuits by springs g g, which are held by adjusting-shafts h h, the springs having chains or cords attached at one end to be wound upon the respective shafts.

Figure 1:
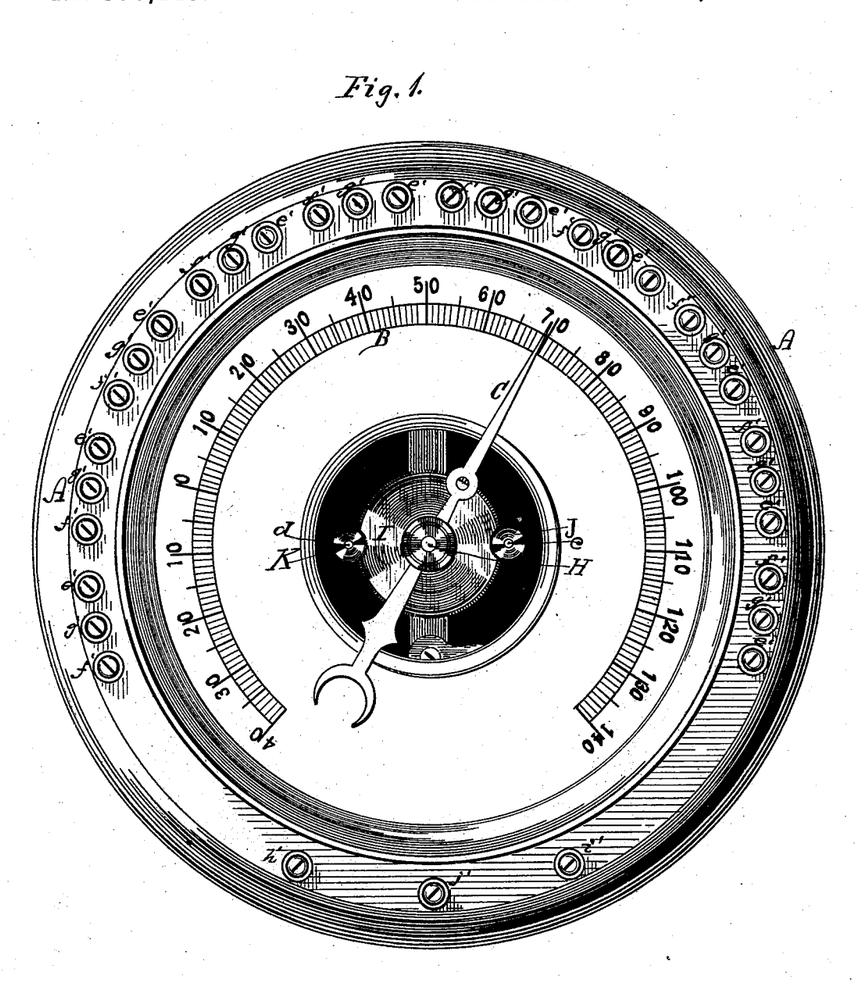
Figure 1 represents a front view of the improved receiving, indicating, transmitting, and distributing instrument for thermometric indications.
Figure 2:
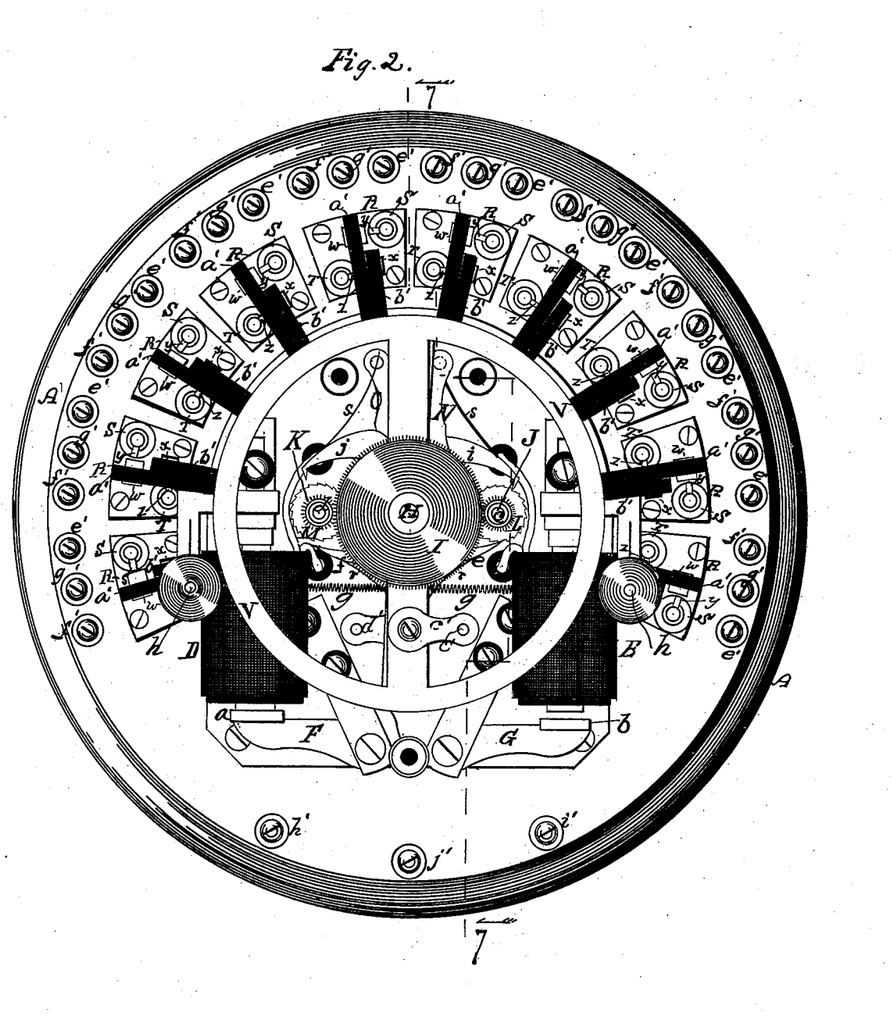
Fig. 2, a corresponding view of the instrument, the front case, the index, and graduated scale-plate being removed to show the mechanical devices behind them.
Figure 3:
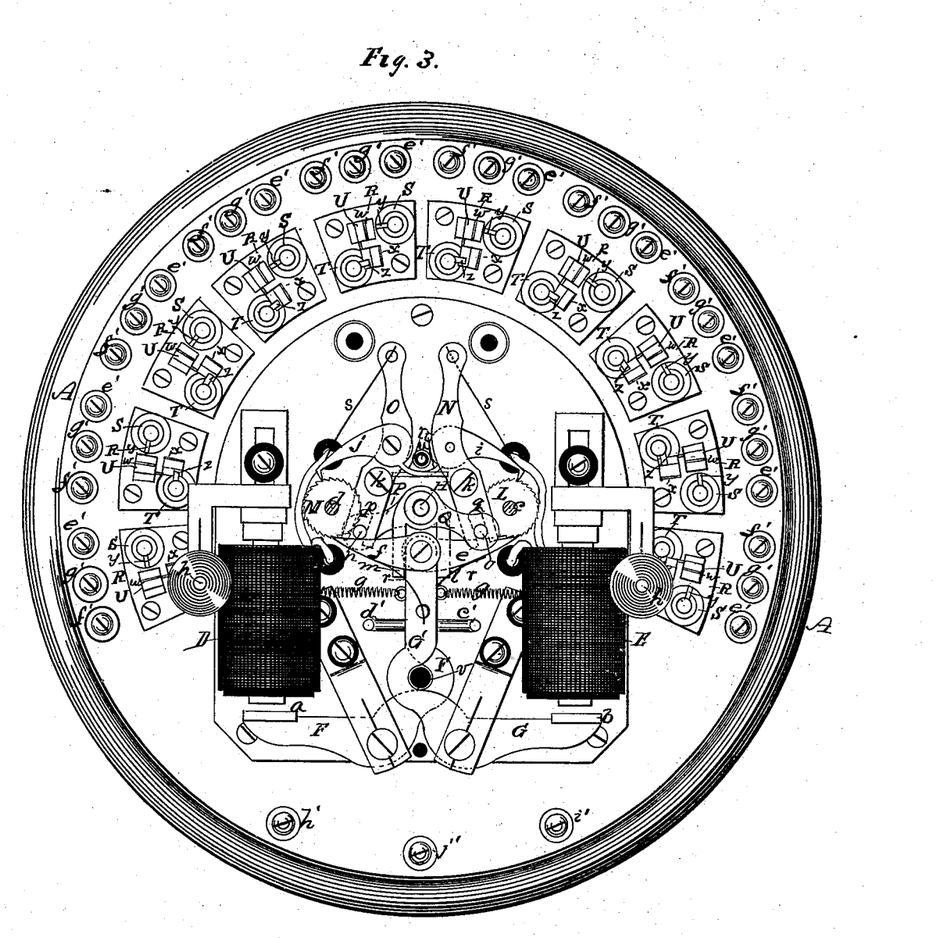
Fig. 3, a corresponding view, the operative device for opening and closing the local distributing-circuits being also removed to show the electro-magnetic vibratory mechanism for actuating the temperature-indicating index, and primarily for actuating the circuit closing and opening device for the local distributing-circuits, the parts being shown in an inoperative position.
Figure 4:
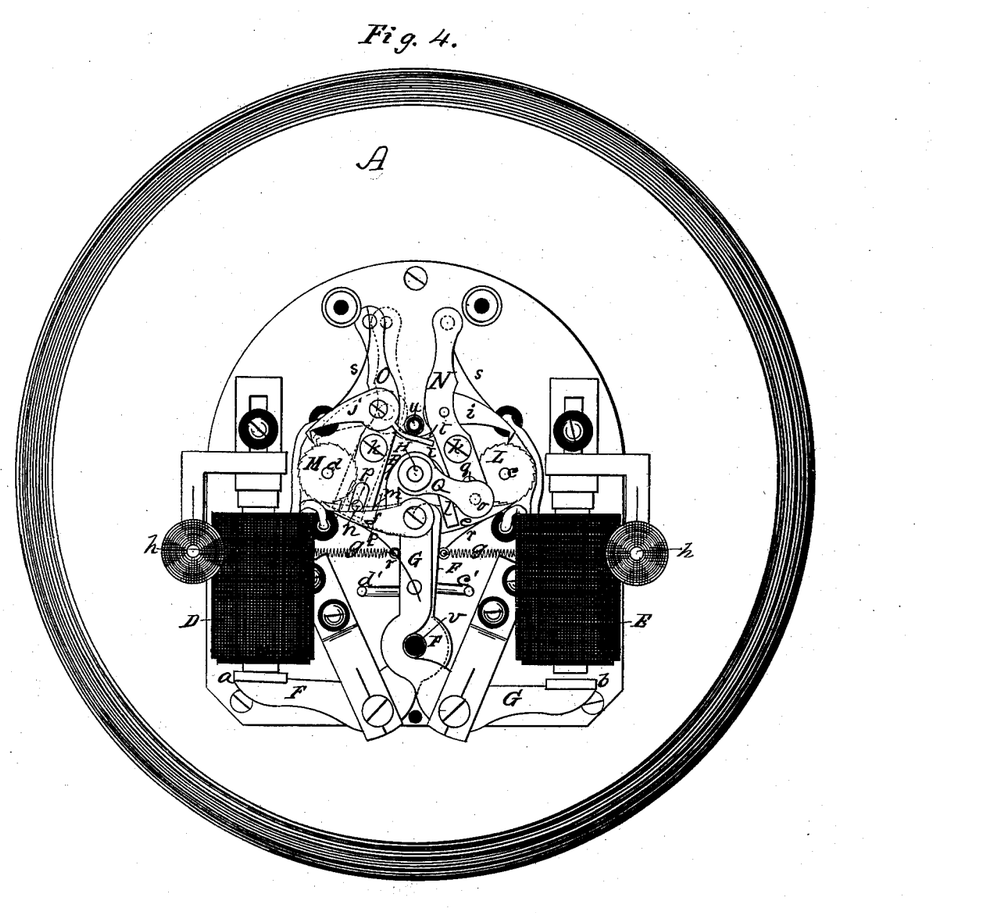
Fig. 4, a view similar to Fig. 3, but showing the parts in a different and operative position.
Figure 5:
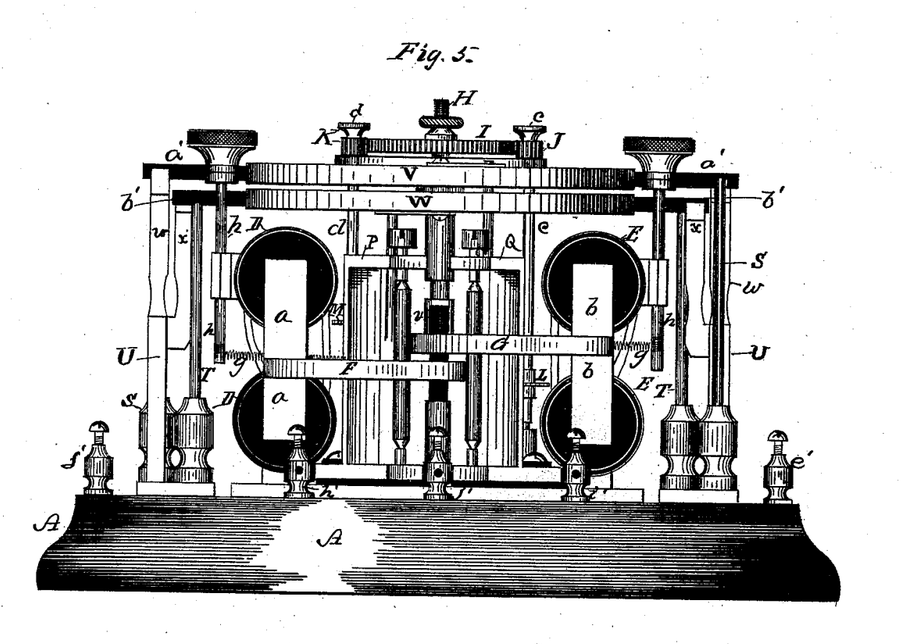
Fig. 5, an under side view of the instrument, the case, index, and degree-scale being removed, as in Fig. 2.
Figure 6:
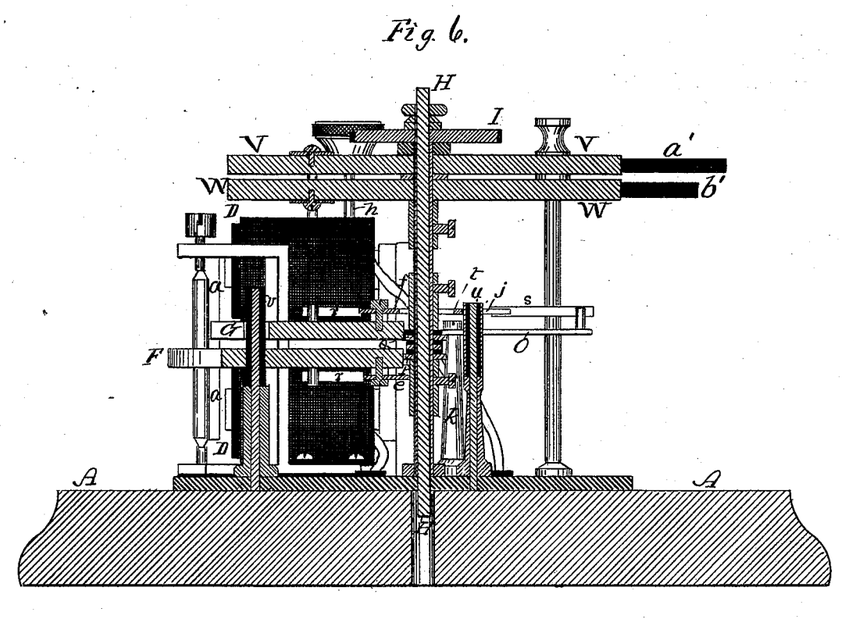
Fig. 6, a central vertical section of the instrument with the same parts removed as in Figs. 2 and 5.
Figure 7:
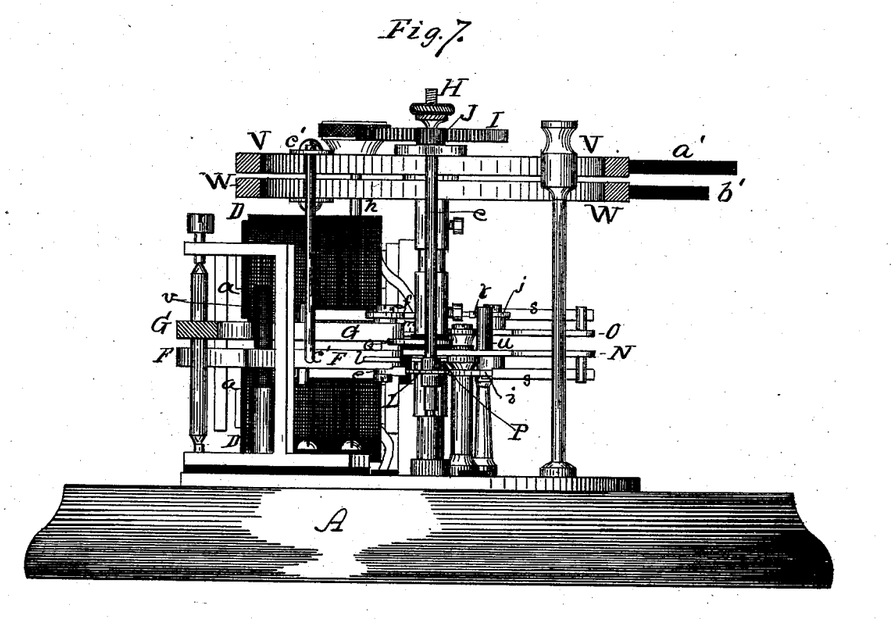
Fig. 7, a partial section and partial interior view of the instrument with the same parts removed, the section being taken in a plane indicated by the line 7 7, Fig. 2.

Since the two pawls e f, actuated directly by the two magnets, move the index-shaft in opposite directions, it is necessary that one pawl should be disengaged from its ratchet-wheel when the other pawl is in action; also, since detents or detent-pawls i j, Figs. 2, 3, 4, 6, 7, are used in connection with the respective ratchet-wheels to prevent any backward movement of the said ratchet-wheels and their shafts while their respective pawls are acting, it is also necessary that each detent-pawl shall be correspondingly brought into and out of engagement with its ratchet-wheel. To accomplish this double purpose in a simple and effective manner I employ the following device: The said detent-pawls are respectively pivoted in proper positions to two separately-vibrating levers, N O, pivoted at k k to a fixed part of the instrument. By the vibration of these levers, as indicated by full and dotted lines in Fig. 4, their respective detent-pawls are brought into or out of engagement with their respective ratchet-wheels. In order to vibrate these detent-levers, two bent or tappet levers, P Q, Figs. 3, 4, 5, 7, 10, are pivoted around the central or index shaft, H, one arm, as l or m, of each being arranged as a tappet, against which the inner end of one or the other of the armature-levers F G strikes when its armature is drawn to its magnet. The other arm of each lever has a pin or stud, as n or o, which engages with a fork or slot, as p or q, of one or the other of the detent-levers. The arrangement is such, as shown, that when either armature-lever is vibrated to engage its pawl with its ratchet-wheel it draws, by its tappet-lever, the forked end of the detent-lever of the other ratchet-wheel, thereby moving the other end thereof outward, and consequently moving the detent-pawl carried thereby out of engagement with its ratchet-wheel, as required. At the same time the pin or stud in the said tappet-lever, which works in the fork of the detent-lever, bears against the inner edge of the actuating-pawl of the other armature-lever and disengages it from the same ratchet-wheel, all as shown most clearly in Fig. 10. A reverse movement of the tappet-lever when the active armature-lever is reversed reverses the position of its detent-lever and allows the actuating-pawl to come again into active position. These actuating parts are brought into active position by springs r r, which are also sufficiently strong to force the tappet-levers and detent-levers back into normal position, as shown in Fig. 3, where the armature-levers are shown out of action and retracted. In this position of the parts both actuating-pawls are in position for action on the ratchet-wheels, as shown. The detent-pawls also have engaging-springs s s, which also hold both of the pawls in engagement with the ratchet-wheels in the position of the parts shown in the said figure.

Each detent-pawl has a guide-arm, t, projecting inward in contact with a fixed guiding-stud, u, substantially as shown, both pawl-arms acting against the same stud, for simplicity. These arms and stud serve to keep the detent-pawls in proper positions at all times, holding them away from the ratchet-wheels when the detent-levers move the said detent-pawls away from the said ratchet-wheels and allowing the pawls to have a free movement over the teeth of the ratchet-wheels when they are in engagement therewith. Another fixed stud, v, is so placed as to limit the retracting movement of the armature-levers. The different levers, pawls, and ratchet-wheels for the respective magnets are in different planes in the instrument, so that one does not interfere with the other.

I now proceed to describe that part of the instrument by which the electric currents are simultaneously transmitted through any required number of sets of heat-increasing and heat-decreasing circuits for transmitting and distributing the same thermometric indications as are indicated by the instrument itself by the means above set forth, or otherwise.

Figure 8:
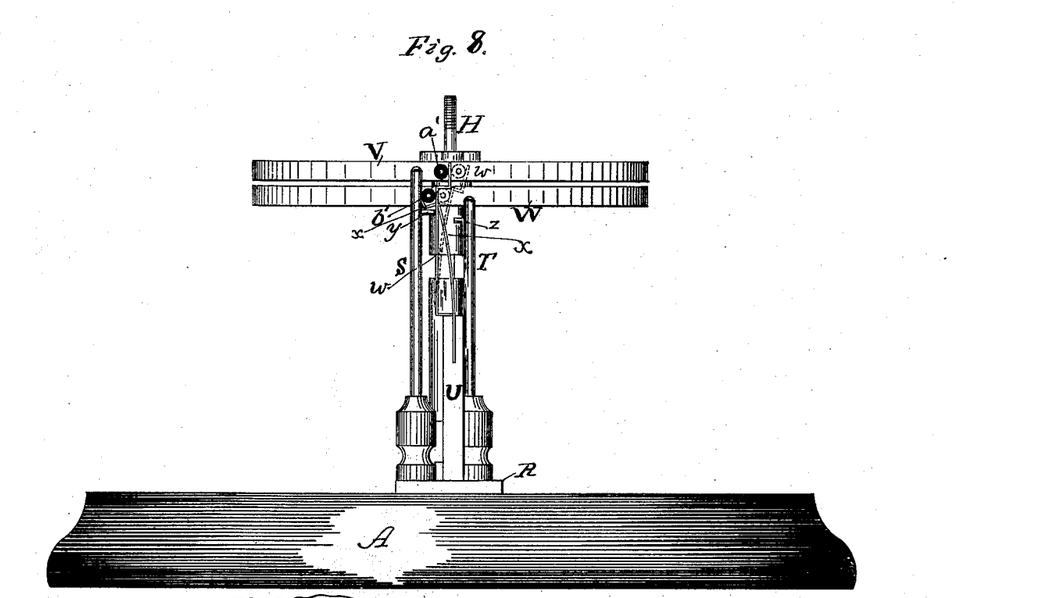
Fig. 8, a side view of a fractional portion of the instrument, showing in detail the device for opening and closing one set of the multiple transmitting or distributing circuits.

Concentrically upon the base or back A of the instrument, and around the central or index shaft, H, are arranged as many small stands or bases R R, Figs. 2, 3, 8, as there are required or desired of sets of distributing or transmitting circuits. These stands are all insulated from one another by any suitable means. Upon each stand are three posts or studs, S T U, the post S in an increasing-temperature circuit, the post T in a decreasing-temperature circuit, and the post U in the return-circuit of the same system. The post U may be in electric connection with the base or stand k; but in that case the other posts, S T, are insulated therefrom, and of course from each other. From the return-circuit post U two circuit-closing springs or very thin elastic metallic strips, w x, project forward or outward in substantially parallel positions as the parts are shown arranged. When left free, each metallic strip bears against a pin or projection, y or z, on the adjacent post, S or T, and thus closes the circuit, and when the elastic strip is moved away from contact with the adjacent pin that circuit is broken. All of the increasing-temperature posts S S, with their pins y y, and the elastic strips w w, connected therewith, are arranged correspondingly in regular order and at uniform distances from the index-shaft H, or central axis of the instrument, and all of the decreasing-temperature posts T T, with their pins z z, and the elastic strips x x, connected therewith, are similarly arranged in regular order, but either at different distances from the central axis of the instrument or one set projecting forward into a different plane from the other, or both, the latter arrangement being shown in the drawings. In connection with the two sets of elastic circuit-closing plates w w and x x two multiple circuit breaking or closing wheels are employed, substantially as shown and now to be described.

Each wheel is centered around the index-shaft H or other axis concentric with the circuit-posts and circuit-closing elastic plates, and has a limited oscillating movement thereon. The increasing-temperature circuit breaking or closing wheel V has radial spokes or arms $a'\ a'$, one for each circuit-closing elastic strip w of the increasing-temperature circuit on the instrument, projecting outward beyond the rim thereof, so that all of these spokes will come into contact with their respective circuit-closing strips simultaneously. The decreasing-temperature circuit breaking or closing wheel W has a similar set of radial arms or spokes, $b'\ b'$, similarly arranged in relation to the circuit-closing elastic strips x x of the decreasing-temperature circuits. One wheel, V, bears against the elastic strips w w in one direction around the circle, and the other wheel, W, bears against the elastic strips x x in the opposite direction; hence the two wheels are to be operated in opposite directions. At least this is the simplest and most practical arrangement. It follows from the construction here described that when either wheel is moved in the proper direction its spokes will, by bearing against all of the corresponding elastic strips simultaneously, open all of the circuits in that system at the same movement. The reverse movement of the wheel will in turn again close all of those circuits simultaneously. The breaking and closing of each circuit will move all the temperature-indicating indexes of the instruments in those circuits simultaneously one degree on the scale, whether increasing or decreasing temperature, as the case may be; hence, if such a double movement of either wheel is made simultaneously with the closing and opening of either main or receiving circuit of the instrument, corresponding thermometric indications will be distributed through all the distributing-circuits simultaneously therewith. It remains, therefore, only to connect each wheel with the corresponding armature-lever of the instrument, so that the wheel will be vibrated thereby, and the purpose will be effected.

I show in the drawings the increasing-temperature wheel V connected with the increasing-temperature armature F by a connecting arm and rod, $c'$, Figs. 2, 3, 4, 7, and the decreasing-temperature wheel W connected with the decreasing-temperature armature G by a connecting arm and rod, $d'$, also shown in Figs. 2, 3, 4, and 7. The movements of the two circuit breaking or closing wheels, in connection with the circuit-closing elastic strips and posts, are most clearly shown in the detail view, Fig. 8. Instead of the arrangement shown and above described, the elastic strips w x may normally remain out of contact with the pins on the posts S T, and the first movement of each wheel close all the circuits, since the advancement of the indexes one degree is produced by a double vibration of its actuating-pawl, and it matters not which takes place first, the closing or breaking of the circuit of the impelling-magnet. The radial arms or spokes $a'\ b'$ are of insulating material—such as hard india-rubber—so as not to interfere with the circuits.

Sets of binding-posts $e'\ f'\ g'$ are respectively connected in circuit with the posts or studs S T U, and these binding-posts receive, respectively, the increasing temperature circuit-wires 1 1, decreasing-temperature circuit-wires 2 2, and return-circuit wires 3 3. Three binding-posts, $h'\ i'\ j'$, are shown for the corresponding circuit-wires 1 2 3 of the main line of the instrument.

Figure 9:
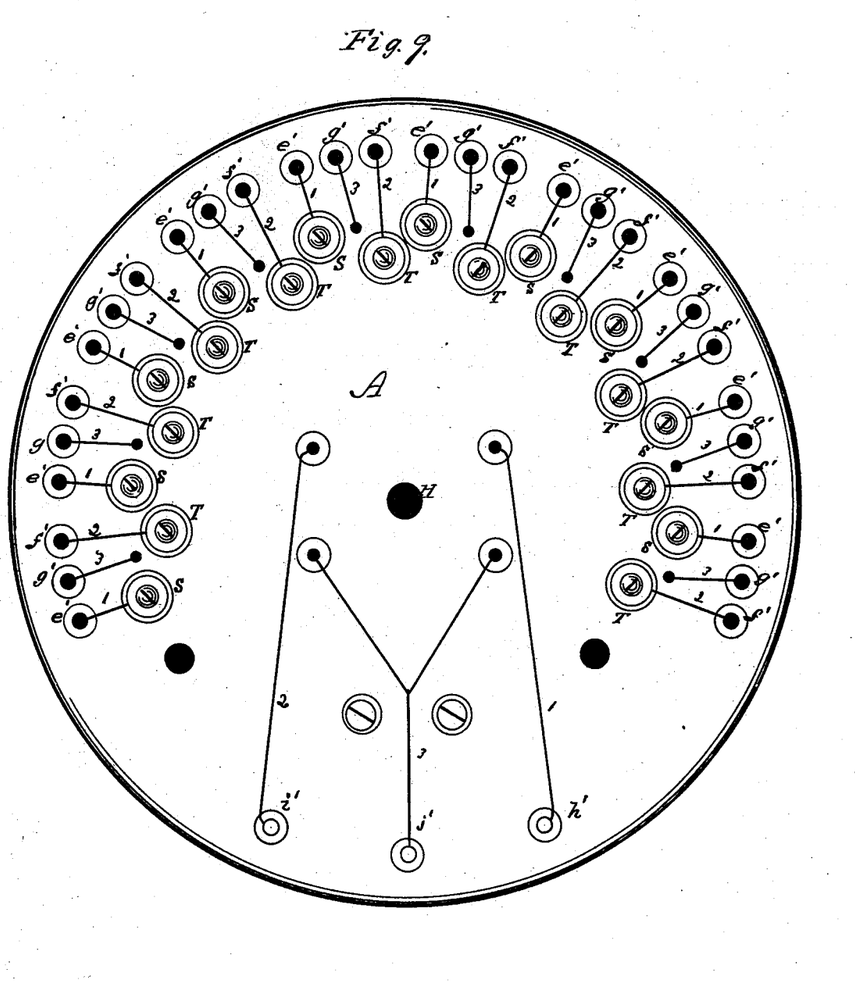
Fig. 9, a back view of the base of the instrument.
Figure 10:
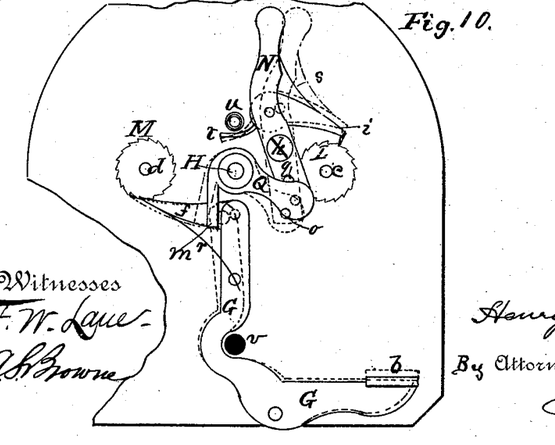
Fig. 10, a separate view of one of the armature-levers for actuating the index-shaft.

In Fig. 9 I have shown the circuit-connections for the main line as connected with the instrument. In each circuit the numeral 1 indicates the increasing-temperature wire, 2 the decreasing temperature wire, and 3 the return-circuit wire. Each circuit or system of circuits is of course to have a battery to furnish the electric current for the wires.

Figure 11:
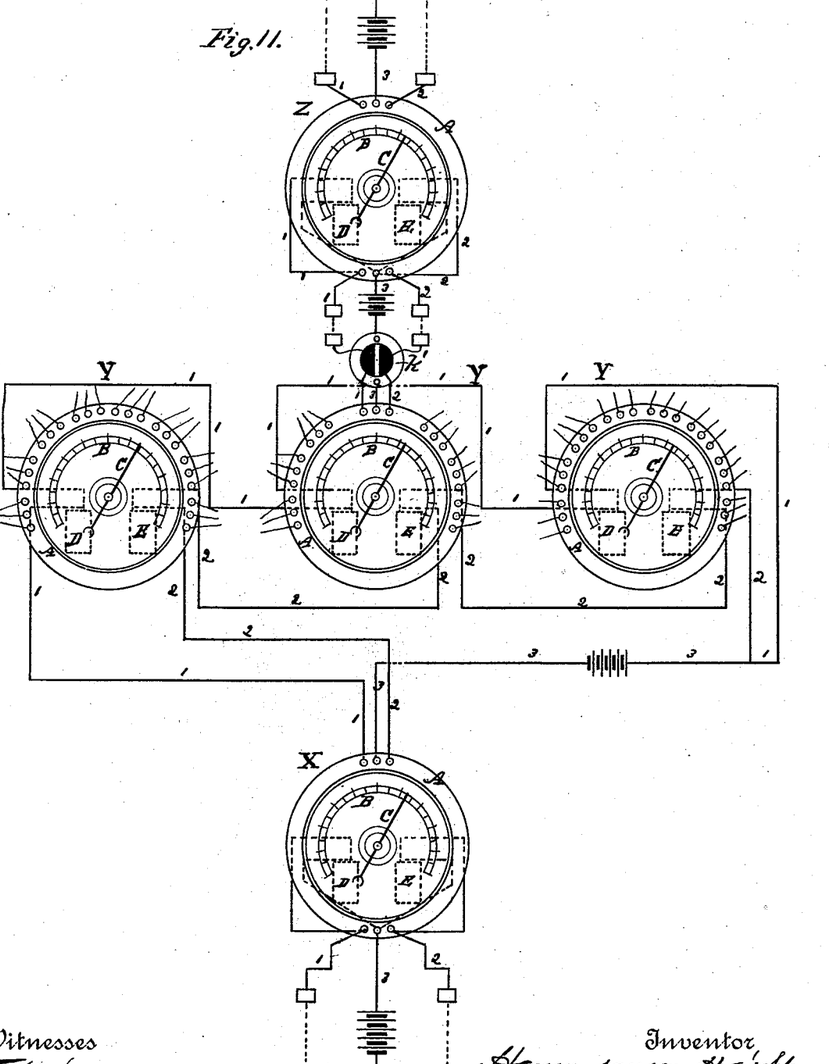
Fig. 11, a diagram illustrating the means for transmitting thermometric indications by this instrument through one observatory or station to another, and also of distributing the same indications from the main receiving observatory or station to neighboring distributing observatories or stations.

In the diagram Fig. 11 I show the means for connecting the instruments in different places by the current-wires, the same numerals indicating the corresponding wires, the same as in Fig. 9. This diagram also illustrates the means for transmitting and distributing the thermometric indications through the improved instrument. The main receiving-instrument at any observatory—say in New York—is represented at X as receiving thermometric indications from another observatory—as in Washington—through the circuit-wires shown at the bottom of the sheet. Three local instruments, Y Y Y, as in different parts of the same city, (New York,) are shown as connected by wires with the main instrument X, these three local instruments having each distributing-circuits, as above described, for distributing the indications to public and private buildings in neighboring localities. From one of these local instruments one set of circuit-wires transmits the indications to another main receiving-instrument, Z, situated, say, in another distant city, as Albany. In the circuits leading to the last-named instrument is shown a regulating or index-adjusting instrument, $k'$—such, for instance, as that set forth in my application for Letters Patent filed March 8, 1886, Serial No. 194,439.

Figure 12:
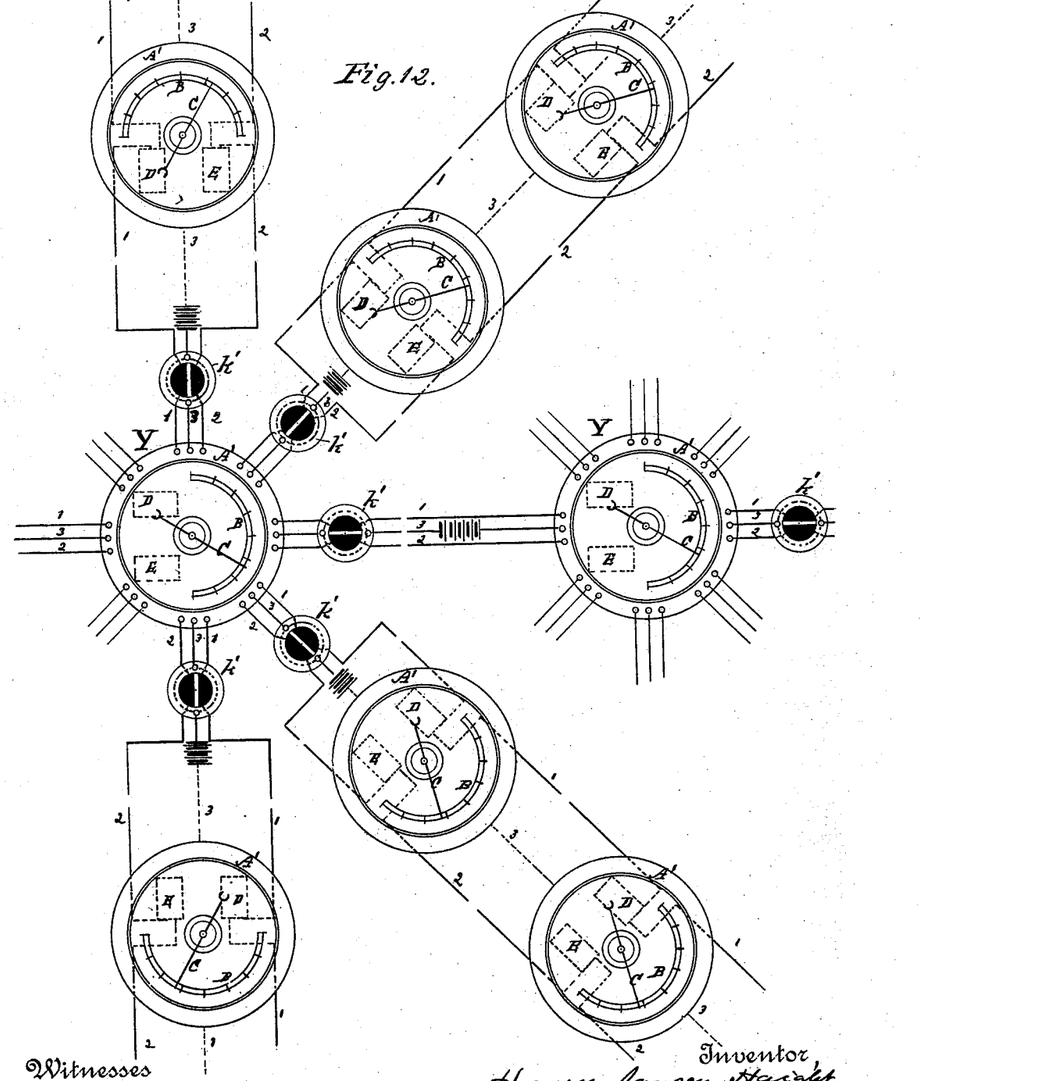
Fig. 12, another diagram illustrating the means for transmitting and distributing the thermometric indications by this instrument through successive local instruments in different branch circuits and through main circuits.

In Fig. 12 I represent another diagram, showing two local distributing-instruments, Y Y, connected together by circuit-wires, and from one of these distributing-instruments different branch circuits connect together successive simple receiving-instruments, A' A', for local use to any extent desired, each instrument having its own battery in the receiving-circuits. In all of these connecting-circuits I have shown regulators $k'$ $k'$, as above referred to. Thus it will be seen that by means of my improved receiving, transmitting, and distributing instrument thermometric indications from a single observatory or station may be transmitted to distant and local stations or localities to any extent desired.

As shown in the diagram Fig. 11, in each set of main circuits only a single continuous wire is used, and that is the return or battery wire 3. The other two circuits are ground-circuits with short wires 1 and 2. By this construction and arrangement one wire is dispensed with in each set as compared with the usual construction.

I claim as my invention—

1. In an electro-magnetic receiving-instrument for thermometric indications, the combination, with the index C, of the index-shaft H, having a gear-wheel, I, mounted thereon, two gear-wheels, J K, gearing into the wheel I, oppositely-acting ratchet-wheels L M, respectively, on the shafts of the said gear-wheels J K, pawls acting upon the respective ratchet-wheels, armature-levers F G, carrying the respective pawls, and electro-magnets D E, respectively, in the increasing-temperature and decreasing-temperature transmitting-circuits and moving the respective armature-levers and the said increasing-temperature and decreasing-temperature circuits, substantially as and for the purpose herein described.

2. In combination with the armature-levers, increasing and decreasing temperature magnets operating the same, and with oppositely-acting ratchet-wheels connected by gearing with the index-shaft, pawls vibrated by the respective armature-levers and engaging with the respective ratchet-wheels, and detent-pawls engaging, respectively, with the said ratchet-wheels and vibrated by separate detent-levers, each detent-lever being connected with and moved by the armature-lever which vibrates the other ratchet-wheel, substantially as herein specified.

3. The combination of the increasing and decreasing temperature magnets, armature-levers respectively actuated thereby, the index and index-shaft, ratchet-wheels connected by gearing with the index-shaft and adapted to move the said index-shaft in opposite directions, pawls actuated, respectively, by the armature-levers and actuating in turn the respective ratchet-wheels, separate detent-levers, detents respectively actuated by the detent-levers and engaging in turn with the respective ratchet-wheels, and tappet-levers actuated by the armature-levers and in turn actuating the respective detent-levers and adapted to throw the actuating-pawls into and out of action, substantially as and for the purpose herein specified.

4. In combination with the increasing and decreasing temperature magnets of an electro-magnetic receiving-thermoscope and armature-levers actuated by the said magnets, one or more sets of increasing and decreasing temperature transmitting-circuits, and means for closing and breaking the said transmitting-circuits by the said armature-levers simultaneously with the closing and breaking of the receiving-circuits, for the purpose herein set forth.

5. In combination with the increasing and decreasing temperature magnets of an electro-magnetic receiving-thermoscope and armature-levers actuated by the said magnets, one or more sets of increasing and decreasing temperature transmitting circuits, each circuit provided with a circuit closer and breaker, and separate increasing and decreasing temperature wheels actuated, respectively, by the armature-levers and adapted to actuate simultaneously all the corresponding circuit closers and breakers of the transmitting-circuits, substantially as and for the purpose herein specified.

6. The combination of the circuit closing and breaking wheels V W and the several sets of circuit-posts S T U, respectively, in increasing-temperature, decreasing-temperature, and return circuits of the respective systems of circuits, and severally provided with circuit closers and breakers, substantially as and for the purpose herein specified.

7. The combination of the increasing and decreasing temperature posts S T, provided, respectively, with circuit-closing pins or projections $y$ $z$, the return-circuit post U, provided with elastic circuit closing and breaking strips $w\ x$, and the circuit closing and breaking wheels V W, provided, respectively, with arms or spokes $a'\ b'$, substantially as and for the purpose herein specified.

8. The combination, in one instrument, of one or more sets of increasing and decreasing temperature receiving-circuits for the transmission of thermometric indications, electro-magnets situated in the respective circuits, armature-levers impelled by the several magnets, and a series of sets of increasing and decreasing temperature further transmitting or distributing circuits, adapted to be simultaneously closed and broken by the actuating means of the said armature-levers, for the purpose herein specified.

9. The combination of an electro-magnetic receiving-thermoscope provided with multiple sets of further transmitting or distributing circuits, adapted to be simultaneously closed and broken by the electro-magnets placed in the receiving-circuits, and a series of receiving-thermoscopes having, respectively, electro-magnets placed in the said distributing-circuits, substantially as and for the purpose herein set forth.

10. The combination of an electro magnetic receiving-theremoscope provided with multiple sets of further transmitting or distributing circuits, adapted to be simultaneously closed and broken by the electro-magnets placed in the receiving-circuits, a series of receiving and multiple transmitting or distributing thermoscopes connected, respectively, with the transmitting-circuits of the first receiving-thermoscope, and a further series of receiving-thermoscopes having, respectively, electro-magnets placed in the distributing-circuits of the series of receiving and transmitting thermoscopes, substantially as and for the purpose herein set forth.

11. The combination of two or more receiving and transmitting thermoscopes, a single return-circuit wire connecting any two of the said thermoscopes, an increasing-temperature ground-circuit connection between the two thermoscopes, and a decreasing-temperature ground-circuit connection between the said thermoscopes, substantially as and for the purpose herein specified.

HENRY JANSEN HAIGHT.

Witnesses:
C. S. NEWELL,
JOHN LOGAN.